Feb. 27, 1968   I. AINSLIE   3,370,737
CONTAINERS
Filed Jan. 13, 1965
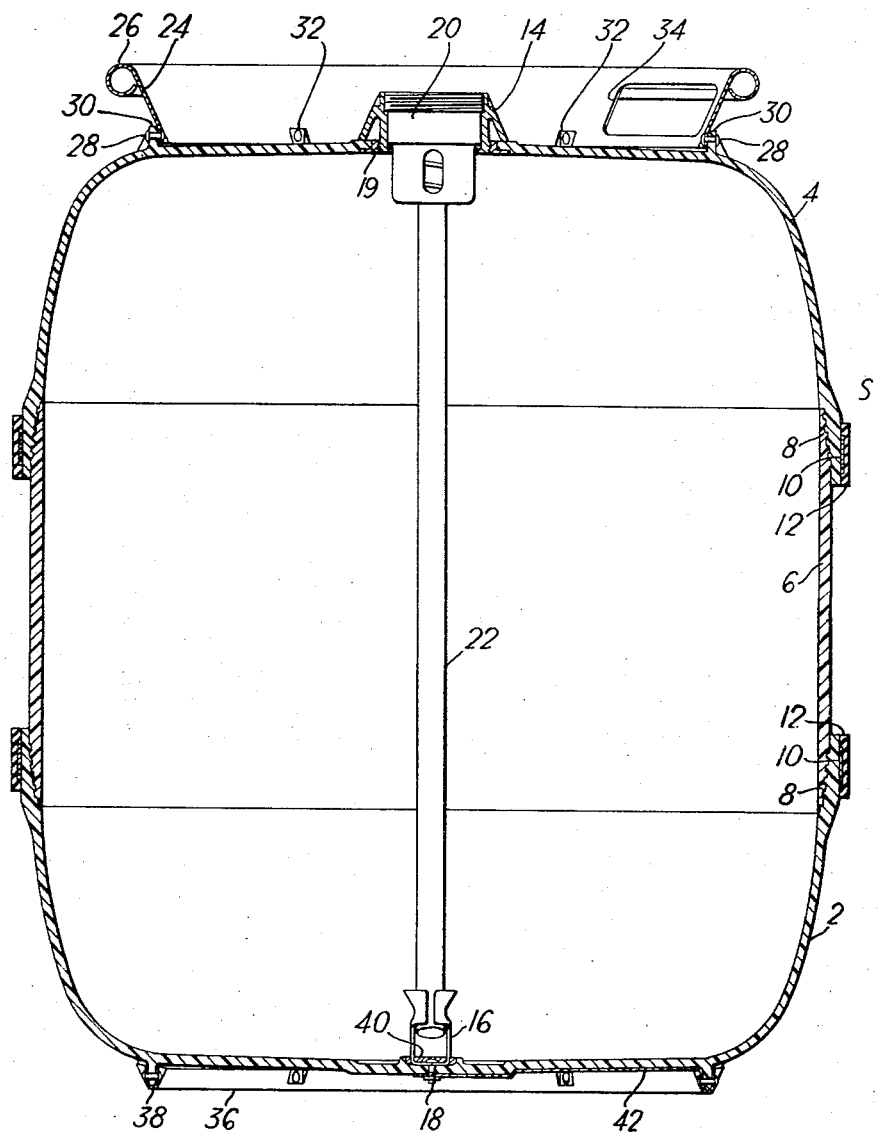
Inventor
Ian Ainslie
By
Bailey, Stephenson & Huettig
Attorneys United States Patent Office 3,370,737
Patented Feb. 27, 1968

3,370,737
CONTAINERS
Ian Ainslie, Sanquhar, Scotland, assignor to Ian Ainslie & Company Limited, Sanquhar, Scotland, a British company
Filed Jan. 13, 1965, Ser. No. 425,220
Claims priority, application Great Britain, Jan. 21, 1964, 2,612/64
2 Claims. (Cl. 220—5)

ABSTRACT OF THE DISCLOSURE

A container is formed of two cup-shaped end parts, and optionally an intermediate part, composed of glass fiber reinforced polyester resin. The ends of the parts are threaded, coated with adhesive and then screwed together.

---

This invention is concerned with a method of making containers from plastics materials. It is particularly concerned with beer kegs, but it is also applicable to other containers, especially containers for chemically active liquids.

According to the present invention a container is formed by two cup-shaped end parts moulded from a resin mixture containing glass fibres lying at random in the resin mixture, the end parts being joined together by an adhesive, either directly or through an intermediate tubular part.

The end parts are preferably joined to an intermediate tubular part by means of screw threads and adhesives. For example, each moulded end part may fit over one end of the tubular part and have an internal Acme thread engaging a matching thread ground or machined into the tubular part. The thread preferably tapers slightly towards the adjacent end of the containers. A rubber sealing ring may be interposed between the end face of the tubular part and the opposed annular surface in the end part.

The resin mixture with the glass fibres has initially a dough-like consistency. It is a feature of this invention that the cup-shaped end parts of the container are made by compression moulding the resin mixture between cooperating dies which are forced together so as to spread out between them the desired measured quantity of resin mixture. The use of a resin mixture with random glass fibres enables the end parts of the containers to be made conveniently and economically with a strength capable of withstanding an internal pressure such as that applicable to beer pressurised with carbon dioxide.

An example of a beer container according to this invention is shown in the accompanying drawing which is a longitudinal section through the container.

The container is formed by a lower cup-shaped end part 2, an upper cup-shaped end part 4 and an intermediate tubular part 6. The end parts are stepped outwards in diameter at their circumferences and screw over the ends of the tubular part 6, the thread 8 in each case being a coarse Acme thread at a quarter inch pitch. During assembly, a thin layer of an adhesive, for example the adhesive 828/DDM of the Shell Chemical Company Limited, is applied over the threads to form a permanent and liquid-tight seal. It will be seen that the inner surfaces of the three parts are flush at the joints; this is desirable in the case of a beer keg, since any crevices might tend to retain contaminating matter.

The thread at each end of the tubular part 6 tapers towards the adjacent end of the container, and the internal threads in the end parts are correspondingly tapered, so that the end parts can be screwed tightly onto the tubular part. After the three parts have been assembled together, a nylon ring 10 is fitted around each joint and is in tension so as to add to the security of the joint. Around each nylon ring a rubber ring 12 is fitted and is secured by rubber adhesive. During use, the container can be rolled along the rubber rings.

Before the three parts of the container are secured together, an outlet fitting 14 is secured in a hole machined in the upper end part 4, and a clip 16 is secured to the lower end part 2 by means of a bolt 18. The outlet fitting 14 screws into a bush 19 and the joint is made fluid-tight by a resin adhesive. A similar resin adhesive is applied around the clip 16 to seal the hole through which the bolt 18 passes.

After the three parts of the container have been put together, an extractor fitting 20 is inserted into the outlet 14, and this carries a tube 22 which extends into the clip 16 for support at its lower end. During use, beer is forced into the lower end of the tube 22 by the gas pressure in the container, and the beer flows up the tube 22 and out through the outlet 14 and through a tap or other control device (not shown) screwed into the outlet 14.

A frusto-conical metal ring 24 with a rolled upper edge 26 is secured to the upper end part 4 by rivets 28 passing through integral lug 30 projecting upwards from the end part 4. The rivets actually pass through outwardly deflected tabs 32 struck from the metal ring 24. The ring has two holes 34 defining handle portions by which the container can be carried.

Underneath the lower end part 2 there is a circular metal plate 36 which is riveted to downwardly extending lugs in the same manner as the metal ring 24. When a number of containers are stacked, a rim portion 38 on the plate 36 of one container fits within the ring 24 of the container below it. Before a container is filled with beer, it is inverted over a washing nozzle, and the container is located by the metal ring 24 so that the nozzle directs a jet through the opening 14, the extractor fitting 20 having been previously removed. After the jet has ceased and the water has drained out of the container, the container is inverted ready for filling, and the extractor fitting is inserted into position. Beer is supplied through a pipe (not shown) which is secured into the extractor fitting 20 by means of a bayonet and which pushes down the tube 22 against spring action, so as to bring the lower end of the tube 22 into engagement with a metal contact member 40, and this establishes an electrical circuit from the supply tube, through the tube 22, the contact member 40 and the bolt 18 to a tongue 42 forming part of the circular plate 36, which is in electrical contact with the base of the filling machine; the closing of this electrical circuit then sets off a beer-supply mechanism (not shown) which dispenses a measured quantity of beer into the container.

The end parts 2 and 4 are moulded from a resin mixture consisting of a polyester resin, and accelerator, a catalyst, a mineral filler, and glass fibres of about ½ inch to ⅝ inch length. A preferred mixture is that sold by Resinous Chemicals Limited as their compound DK903.

The tubular part 6 may be made in various ways. For example, it may be cut from a continuous length of plastic tubing formed by winding onto a mandrel a glass fibre thread or a woven glass fibre tape impregnated with a resin, preferably a polyester resin. In this case the ends of the cut off section of tube must be tapered and the thread must be machined. Alternatively, individual tubular parts may be formed by laying around a mandrel sheets of woven glass fibre impregnated with resin, after which the ends of the tube may be tapered by machining, and at the same time the thread may be machined. As a further alternative, the tubular part may be compression moulded between half dies which press into shape a preform of glass fibre mat impregnated with resin, the mat being supported internally by a mandrel. Other methods of manufacture of the tubular part 6 involving moulding are also possible.

In order to avoid tainting the beer inside the container, the inner surface of the container is coated with a non-taint lacquer, for example an epoxy-phenolic lacquer. One or more coats of the lacquer may be applied, for example by spraying or by rolling a quantity of the lacquer around inside the container and then pouring out the excess. The coating lacquer and the various adhesive seals should be hardened by baking for about an hour at 200° C.

The container shown in the accompanying drawing is an 11 gallon container, but containers may be made in this form in various sizes. The resins may be coloured in any desired fashion, and the metal ring 24 or the plate 36 may have trade marks or names impressed on them; the metal in both cases may be stainless steel, aluminum or mild steel.

I claim:
1. A container including two cup-shaped end parts compression molded from a polyester resin mixture containing random laid glass fibers, end portions on said parts, complementary tapered threads on said end portions, an adhesive coating on said threads, and said end portions being screwed together and forming an adhesive reinforced threaded joint.

2. A container including two cup-shaped end parts compression molded from a polyester resin mixture containing random laid glass fibers, an intermediate tubular part of polyester resin reinforced with glass fibers, end portions on said cup-shaped end parts and tubular part, complementary tapered threads on said end portions, an adhesive coating on said threads, and the end portions of said cup-shaped end parts being screwed to the end portions of said tubular part and forming an adhesive reinforced threaded joint.

References Cited

UNITED STATES PATENTS

| 1,535,308 | 4/1925 | Shaw | 220—5 |
| 2,351,387 | 6/1944 | Anderson. | |
| 2,489,766 | 11/1949 | Ernestus | 220—69 |
| 2,973,116 | 2/1961 | Roberge | 220—64 X |
| 3,073,475 | 1/1963 | Fingerhut | 220—3 |
| 3,095,993 | 7/1963 | Balcom | 220—36 X |
| 3,124,001 | 3/1964 | Conley | 220—3 X |

FOREIGN PATENTS

| 976,165 | 3/1961 | France. |
| 326,026 | 6/1962 | Switzerland. |

THERON E. CONDON, *Priamry Examiner.*

GEORGE E. LOWRANCE, *Examiner.*